United States Patent [19]

Martin

[11] 4,340,527

[45] Jul. 20, 1982

[54] CHLORINE-RESISTANT SPANDEX FIBERS

[75] Inventor: Kenneth E. Martin, Waynesboro, Va.

[73] Assignee: E. I. Du Pont de Nemours and Company, Wilmington, Del.

[21] Appl. No.: 292,965

[22] Filed: Aug. 14, 1981

Related U.S. Application Data

[63] Continuation-in-part of Ser. No. 161,606, Jun. 20, 1980, abandoned.

[51] Int. Cl.$^3$ ............................................... C08K 3/22
[52] U.S. Cl. .................................... 524/432; 264/211; 264/205; 264/184; 524/590
[58] Field of Search ..................... 260/45.75 W, 37 N; 264/211, 184, 205; 8/492, 493, 108 R, 108 A, 109

[56] References Cited

U.S. PATENT DOCUMENTS

| | | | |
|---|---|---|---|
| 3,230,193 | 1/1966 | Moulds et al. | 260/45.7 |
| 3,290,165 | 12/1966 | Iannicelli et al. | 260/37 N |
| 3,377,308 | 4/1968 | Oertel et al. | 264/205 |
| 3,386,942 | 6/1968 | Bell et al. | 260/37 N |
| 3,386,944 | 6/1968 | Blomeyer | 260/37 N |
| 3,386,948 | 6/1968 | Needham et al. | 260/45.75 W |
| 3,395,114 | 7/1968 | Smith | 260/45.75 F |
| 3,453,357 | 7/1969 | Logan | 264/176 |
| 3,915,923 | 10/1975 | Ward | 260/32.6 N |
| 4,115,351 | 9/1978 | Joh | 264/182 |
| 4,221,687 | 9/1980 | Minagawa et al. | 260/45.75 W |

FOREIGN PATENT DOCUMENTS

| | | |
|---|---|---|
| 43-5181 | 2/1968 | Japan. |
| 45-3887 | 2/1970 | Japan. |
| 876058 | 8/1961 | United Kingdom. |

OTHER PUBLICATIONS

Gregg et al., *American Dyestuff Reporter*, vol. 53, No. 9, Apr. 27, 1964, pp. 38 to 43.
Moncrief, R. W., *Man–Made Fibers*, 6th Edition, 1975, pp. 486 to 495.
Cuthbertson et al., *Man–Made Fibers*, Science and Technology, vol. 3, 1968, pp. 401, 414, 415.
Castor et al., *Additives for Plastics*, vol. 1, State of the Art (Raymond Seymour–Editor), 1978, pp. 233 to 248.
Solvik, R. S. et al., *Modern Plastics*, Jan. 1974, pp. 78 to 80 and 82.

*Primary Examiner*—V. P. Hoke

[57] ABSTRACT

Spandex fiber made from a segmented polyurethane polymer is provided with improved resistance to chlorine-induced degradation, by the inclusion of finely divided zinc oxide particles having a purity of at least 99.4% dispersed in the fiber.

5 Claims, No Drawings

CHLORINE-RESISTANT SPANDEX FIBERS

CROSS-REFERENCE TO PRIOR APPLICATION

This application is a continuation-in-part of application Ser. No. 161,606, filed June 20, 1980, now abandoned.

BACKGROUND OF THE INVENTION

This invention relates to spandex fibers intended for use in chlorinated aqueous environments, such as are encountered in swimming pools. In particular, the invention concerns such fibers containing finely divided zinc oxide.

DESCRIPTION OF THE PRIOR ART

Spandex fibers, made from long chain synthetic polymers comprised of at least 85% of segmented polyurethanes, are well-known in the art. Yarns of such fibers have been used to produce attractive fabrics, which are useful for, among other things, swimwear. However, the water in swimming pools is chlorinated to such an extent that the active chlorine content is usually between 0.5 and 3 ppm (parts per million) or higher. Exposure of polyurethane spandex fibers in such an environment can result in degradation of the physical properties (e.g., toughness) of the fiber. From a practical standpoint, some degradation can be tolerated without its effects being noticeable to the user of fabrics made with these fibers. Nonetheless, improvements in the resistance to chlorine-induced degradation is needed, especially for yarns of low denier (e.g., less than 100 denier). It is an object of this invention to provide such an improvement.

SUMMARY OF THE INVENTION

The present invention provides a spandex fiber with improved resistance to chlorine-induced degradation by having an effective amount of finely divided, high purity zinc oxide dispersed in the fiber. Zinc oxide assaying at least 99.4% ZnO, preferably at least 99.7% ZnO, is suitable for use in this invention. Zinc oxide concentrations as low as one-half percent or as high as ten percent or more can be effective, but the preferred concentration of the zinc oxide is in the range of 1 to 3% based on the weight of the fiber. The preferred mean particle size is in the range of 0.1 to 1 micron.

DETAILED DESCRIPTION OF THE INVENTION

As used herein the term fiber includes staple fibers and/or continuous filaments.

In accordance with the present invention, the effective amount of finely divided zinc oxide can vary over a fairly broad range. Improvements in resistance to chlorine-induced degradation are obtained at zinc oxide concentrations as low as ½%. However, larger improvements are obtained when the concentration is at least 1%. Although large concentrations of zinc oxide in the fiber (e.g., 10% or more) can sometimes be used, a concentration of less than 5% usually is used because excessive amounts of the additive adversely affect some of the physical properties of the fiber (as produced) as compared to the same fiber without the zinc oxide additive. The preferred range of concentrations of zinc oxide in the fiber is therefore 1 to 3%.

The zinc oxide additive, in accordance with the present invention, is finely divided. This permits a more homogeneous distribution of the zinc oxide in the fiber than could be obtained if the zinc oxide particles were larger. Generally, small particle sizes are used, such as those having a mean size of less than 5 microns. Particles that have a mean size of greater than 5 microns can lead to difficulties in fiber spinning, and, therefore, are generally avoided. Commercially available zinc oxide particles having a mean size of 0.1 micron, or even somewhat smaller, are satisfactory. The preferred range of mean particle size is 0.1 to 1 micron.

Zinc oxide of high purity (e.g., at least 99.4% ZnO) is suitable for use in the present invention. Although less pure zinc oxide can provide some improvement in resistance to chlorine-induced degradation, the higher purity material provides much better chlorine-degradation resistance and fewer adverse effects on physical properties and whiteness retention of the fiber. The high purity zinc oxide can be made by oxidizing zinc metal as in the "indirect" or French process, or an equivalent thereof. In contrast, the "direct" or American process does not provide zinc oxide of as high purity. Among the suitable, high purity, commercially available zinc oxides are "AZO"-77 (sold by ASARCO of Columbus, Ohio), "KADOX"-15 (sold by New Jersey Zinc Company of Bethlehem, Pennsylvania), zinc oxide #20 or #911 (sold by St. Joe Zinc Company of Pittsburgh, Pennsylvania) and U.S.P. zinc oxide (sold by Mallinckrodt of St. Louis, Missouri).

An indication of the purity of the zinc oxide is provided by the sulfur content of the zinc oxide. Elemental analysis has indicated that impurities in the zinc oxide frequently contain cadmium, calcium, copper, iron, lead, magnesium, potassium, sodium, sulfur, etc. A convenient measure of the general level of the impurity content of the zinc oxide, is its sulfur content. The high purity zinc oxide used in the present invention generally has a sulfur content of no more than 0.025% and preferably no more than 0.005%.

In the process of making spandex fibers according to the present invention, which process includes dissolving a long chain synthetic polymer comprising at least 85% segmented polyurethane in an organic solvent and then dry spinning the solution through orifices into filaments, an effective amount of zinc oxide particles, preferably amounting to at least one-half percent and as much as ten percent or more by weight of the polymer, is dispersed within the filaments. The zinc oxide particles can be added at any of several points in the preparation of the spandex fibers. For example, the zinc oxide may be added as slurry to a solution or dispersion of other additives and then mixed with or injected into the polymer solution upstream of the fiber-spinning orifices. Of course, the zinc oxide particles can be added separately to the polymer spinning solution, as a dry powder or as a slurry in a suitable medium.

As indicated above, the improved spandex fibers of the present invention are made from segmented polyurethane polymers, such as those based on polyethers, polyesters, polyetheresters and the like. Such fibers are prepared by well-known methods, such as those described in U.S. Pat. Nos. 2,929,804, 3,097,192, 3,428,711, 3,553,290 and 3,555,115. Some of these spandex polymers are more susceptible than others to chlorine-induced degradation. This can be seen, for example, by comparing the results of Example I below, which concerned spandex fibers made from polyether-based polyurethane, with the results of Example II, which concerned spandex fibers made from polyester-based polyurethane. As shown by these Examples, spandex fibers, such as those made from polyether-based polyurethanes, benefit more than others from the inclusion of zinc oxide particles in accordance with the invention. For this reason, embodiments of the invention that include polyether-based polyurethanes are preferred.

The spandex fibers of the invention may also contain a variety of additives for different purposes, such as delustrants, antioxidants, dyes, stabilizers against heat, light and fumes, etc. so long as such additives do not produce antagonistic effects with the zinc oxide. Also, when finishing or dyeing yarns or fabrics made from fibers of the invention, care must be exercised to avoid deactivating or dissolving the zinc oxide.

The following test procedures are used for measuring the various parameters discussed above.

The concentration of zinc oxide in the fiber is determined as follows. A weighed sample of fiber is ashed in a platinum dish in a muffle furnance at 800° C. for 10 to 20 minutes. The thusly formed residue is dissolved in 50% HCl solution. Insolubles are removed by filtration. Then, in accordance with the procedures described in "Analytical Methods for Atomic Absorptions", Perkin-Elmer Corp. of Norwalk, Connecticut (1973), the filtrate is analyzed with a Perkin-Elmer Model 370 Atomic Absorption Spectrophotometer (or equivalent) equipped with a zinc lamp and calibrated with a sample containing a known amount of zinc oxide. The zinc oxide concentration is then calculated as a percent of the total weight of the fiber.

The purity of the zinc oxide can be measured by means of a potassium ferrocyanide titration, as described in "Commercial Methods of Analyses" by F. O. Snell and F. M. Biffen, McGraw-Hill Book Company, Inc., New York, (1944), pages 504–506.

The sulfur content of the zinc oxide can be measured by X-ray fluorescence spectroscopy. A Philips Model PW-1400 X-ray Spectrometer, equipped with a graphite crystal in a vacuum atmosphere and an X-ray tube with a silver target, is suitable. The spectrophotometer is operated at 50,000 volts and 40 milliamps. The response of the $K\alpha$ line of sulfur is measured according to the general directions of the PW-1400 Operation Manual, published by N. V. Philips Gloeilampanfabrieken, Eindhoven, The Netherlands (1980). The instrument is calibrated by analyzing samples of zinc oxide, found by other means to contain no detectable quantities of sulfur and to which known amounts of potassium sulfate were then added.

The mean size of the zinc oxide particles in the fiber is measured by Joyce-Loebl-Disk-Centrifuge techniques in accordance with procedures described in "Instruction Manual for ICI-Joyce Loebl Disk Centrifuge Mk-III with Photosedimentometer", Joyce Loebl Co. Ltd., Durham, England. Usually, the mean particle size in the fiber is about equal to the size of the particles fed to the polymer solution used in preparing the fibers. Very little reduction in particle size occurs in the process of making the fibers containing the zinc oxide.

Toughness of the spandex fiber is defined as the product of the break tenacity and break elongation and is measured on an Instron machine. A 2-inch (5.1-cm) length of yarn of known denier is suspended between the clamps of an Instron Model TM testing machine, equipped with a tensile load cell of "A" capacity. The sample is elongated at the rate of 20 inches/minute (51 cm/min). The percent elongation at yarn break (break elongation) and the retractive force in grams at yarn break, divided by the original denier of the yarn (break tenacity) are recorded. All testing is carried out at 70° F. (21° C.) and 65% relative humidity after the yarns have been brought to equilibrium with those conditions. Three test samples are averaged for each determination.

To test the resistance of the spandex fibers to chlorine-induced degradation, an 8-inch (20-cm.) long sample of yarn (e.g., 4-filament, 40 denier) made from the fibers is subjected to a "chlorinated-water exposure test." In this test, the yarn is extended to 150% of its original length and then, while maintained extended, is immersed for 24 or 72 hours in a stirred water bath of about 150-liter volume, maintained at about 22° C., a pH of 7.5 by addition of hydrochloric acid, and an active chlorine concentration of 3 parts per million by addition of sodium hypochloride solution. After exposure, the sample is dried and its physical properties measured as described in the preceding paragraph. The performance of yarns in the chlorinated-water exposure test correlates with the performance of corresponding yarns in swimwear fabrics exposed in chlorinated swimming pools.

The concentration of chlorine in "chlorinated" water is defined herein as the concentration of chlorine that is capable of oxidizing iodide ion to iodine. This concentration is measured by a potassium iodide, sodium thiosulfate titration and is reported as parts per million of "active chlorine" ($Cl_2$). The titration method consists of adding 20 milliliters of a 10% potassium iodide aqueous solution, 10 milliliters of glacial acetic acid and 5 milliliters of 0.5% starch solution to 200 milliliters of the chlorinated water to be analyzed and titrating the mixture to a starch/iodine end point with 0.01 N sodium thiosulfate.

The invention is further illustrated, but is not intended to be limited, by the following examples in which all percentages are by total weight of the fibers unless otherwise specified.

EXAMPLE I

This example illustrates the reduction that is obtained in chlorine-induced degradation when a dispersion of zinc oxide particles in accordance with the invention is present in a spandex yarn made from a polyether-based linear segmented polyurethane.

A solution of segmented polyurethane in N,N-dimethylacetamide was prepared in accordance with the general procedure described in U.S. Pat. No. 3,428,711 (e.g., first sentence of Example II and the description of Example I). An intimate mixture was prepared of p,p'-methylenediphenyl diisocyanate and polytetramethylene ether glycol (of about 1800 molecular weight) in a molar ratio of 1.70 and was held at 80° to 90° C. for 90 to 100 minutes to yield an isocyanate-terminated polyether (i.e., a capped glycol), which was then cooled to 60° C. and mixed with N,N-dimethylacetamide to provide a mixture containing about 45% solids. Then, while maintaining vigorous mixing, the capped glycol was reacted for 2 to 3 minutes at a temperature of about 75° C. with diethylamine and an 80/20 molar ratio of ethylenediamine and 1,3-cyclohexylenediamine chain extenders. The molar ratio of diamine chain extender to diethylamine was 6.31 and the molar ratio of diamine chain extenders to unreacted isocyanate in the capped glycol was 0.948. The resultant solution of segmented polyurethane contained approximately 36% solids and has a viscosity of about 2100 poises at 40° C. This polymer had an intrinsic viscosity of 0.95, measured at 25° C. in N,N-dimethylacetamide at a concentration of 0.5 gram per 100 ml of solution.

To the resultant viscous polymer solution were added titanium dioxide, a copolymer of diisopropylaminoethyl methacrylate and n-decyl methacrylate (in a 70/30 weight ratio), 1,1-bis (3-t-butyl-6-methyl-4-hydroxyphenyl)butane, and ultramarine blue pigment (sold by Reckitts, Ltd., North Humberside, England) in addition to the amounts of zinc oxide indicated in the table below, such that these additives respectively amounted to 4.7, 4.7, 1.0, and 0.01% based on the weight of the final fibers. The zinc oxide, St. Joe 20, manufactured by St. Joe Zinc Company, had a purity of 99.4% ZnO, a sulfur content of 185 parts per million, and an average particle size of 0.4 micron.

The polymer solution was dry spun in a conventional manner through orifices to form coalesced 4-filament, 40-denier yarns. These yarns were then subjected to a simulated finishing treatment during which the yarns (usually a 20-cm. sample) were immersed for 30 minutes at atmospheric pressure in 3 liters of 85° to 96° C. water which contained 4.5 grams of tetrasodium pyrophosphate and 4.5 grams of "Duponol EP" (a detergent mainly consisting of diethanolamine lauryl sulfate, sold by E. I. du Pont de Nemours and Company of Wilmington, Delaware).

The finished yarns, designated as yarns "a" through "g", were then subjected to the "chlorinated-water exposure test". The results of the exposure to the chlorinated water are summarized in Table I.

Note that yarn "a" and yarn "b", which were comparison yarns and contained zero and 0.26% zinc oxide, respectively, were severely degraded in physical properties within a very short time. For example, in 24 hours of exposure to the chlorinated water, these two yarns were degraded to less than 10% of their initial toughness and in 72 hours, to 2% or less. In contrast, after 24 hours exposure, yarn "c" of this invention, which contained 0.7% zinc oxide, retained more than 30% of its initial toughness and yarn "d" of this invention which contained 1.3% zinc oxide, retained more than 80% of its toughness. Yarns "e", "f" and "g", which respectively contained 1.5, 2.1 and 2.7% zinc oxide also demonstrated strong resistance to chlorine-induced degradation. Thus, the data in the table show that these yarns of the invention having zinc oxide contents in the referred range of 1 to 3%, retain 8 to 10 times as much of their initial toughness after 24 hours of exposure to chlorinated water and about 40 times as much of their initial toughness after 72 hours of exposure as do such polyether-based spandex fibers in which no zinc oxide or ineffective amounts of zinc oxide are present.

EXAMPLE II

This example illustrates the reduction that is obtained in chlorine-induced degradation when a dispersion of zinc oxide particles in accordance with the invention is present in a spandex yarn made from a polyester-based linear segmented polyurethane.

A hydroxy-terminated polyester of about 3400 molecular weight was formed by reaction of 17.3 parts of ethylene glycol and 14.9 parts of butanediol with 67.8 parts of adipic acid. An isocyanate-terminated polyester was then formed by reacting at 80° C., 100 parts of the hydroxy-terminated polyester with 13.0 parts of p,p'-methylenediphenyl diisocyanate. The isocyanate-terminated polyester was then dissolved in 163.2 parts of N,N-dimethylacetamide and reacted with 1.30 parts ethylenediamine and 0.19 parts of diethylamine dissolved in an additional 54.6 parts of N,N-dimethylacetamide. The resultant polymer solution was blended with (a) the polyurethane formed as described in U.S. Patent 3,555,115 by the reaction of t-butyldiethanolamine and methylene-bis-(4-cyclohexylisocyanate) and (b) the condensation polymer from p-cresol and divinylbenzene, as described in U.S. Pat. No. 3,553,290, which additives respectively amounted to 1.0 and 0.5 by weight of the final fibers that were produced by spinning. The thusly prepared polymer solution was dry spun in the conventional manner through orifices to form a coalesced four-filament, 40-denier yarn (yarn "h"). A second yarn (yarn "i") was prepared in the same way as yarn "h", except that zinc oxide particles of about 1 micron average size, manufactured by Mallinckrodt and having a purity of 99.7% ZnO and a sulfur content of 24 parts per million, were blended into the polymer solution prior to spinning. The zinc oxide content of yarn "i" was 1.1%.

Yarns "h" and "i" were then finished as in Example I. The yarns were then subjected to the "chlorinated-water exposure test". The results are shown in Table I. Note that yarn "i", which contained 1.1% zinc oxide, is much superior to yarn "h" (which contained no zinc oxide) in its ability to resist chlorine-induced degradation.

TABLE I

Effects of Exposure to Chlorinated Water on Properties of Yarns of Ex. I and II

| Sample | % ZnO | Exposure Hours | Elongation, % | Tenacity* gpd | Toughness gpd. %** | % of Initial Toughness |
|---|---|---|---|---|---|---|
| a | 0 | 0 | 560 | 1.10 | 610 | 100 |
|   |   | 24 | 340 | 0.15 | 50 | 8 |
|   |   | 72 | 150 | 0.05 | 8 | 1 |
| b | 0.26 | 0 | 520 | 0.85 | 440 | 100 |
|   |   | 24 | 270 | 0.15 | 40 | 9 |
|   |   | 72 | 170 | 0.07 | 10 | 2 |
| c | 0.70 | 0 | 550 | 1.04 | 580 | 100 |
|   |   | 24 | 440 | 0.42 | 190 | 34 |
|   |   | 72 | 290 | 0.14 | 40 | 7 |
| d | 1.3 | 0 | 440 | 0.92 | 410 | 100 |
|   |   | 24 | 430 | 0.79 | 340 | 83 |
|   |   | 72 | 470 | 0.73 | 340 | 83 |
| e | 1.5 | 0 | 510 | 0.86 | 440 | 100 |
|   |   | 24 | 460 | 0.85 | 400 | 91 |
|   |   | 72 | 460 | 0.74 | 340 | 77 |
| f | 2.1 | 0 | 460 | 1.01 | 460 | 100 |
|   |   | 24 | 430 | 0.82 | 350 | 76 |
|   |   | 72 | 450 | 0.77 | 340 | 74 |
| g | 2.7 | 0 | 570 | 0.98 | 560 | 100 |
|   |   | 24 | 470 | 1.02 | 480 | 86 |
|   |   | 72 | 450 | 0.80 | 360 | 64 |
| h | 0 | 0 | 760 | 0.55 | 420 | 100 |
|   |   | 24 | 700 | 0.31 | 220 | 52 |
|   |   | 72 | 610 | 0.15 | 90 | 21 |
| i | 1.1 | 0 | 810 | 0.49 | 400 | 100 |
|   |   | 24 | 750 | 0.45 | 340 | 85 |
|   |   | 72 | 750 | 0.41 | 310 | 77 |

*Tenacity is in grams per denier (gpd)
**Toughness is grams per denier tenacity multiplied by % elongation, (gpd. %).

EXAMPLE III

In this example, spandex yarns containing zinc oxide particles of high purity, in accordance with the present invention, are compared in their resistance to chlorine-induced degradation to such yarns containing less pure zinc oxide. Except for the type of zinc oxide, the purity, the sulfur content, and the total amount of zinc oxide dispersed in the yarn, which characteristics are summarized in Table II, all the yarns were prepared, finished and tested as described in Example I. The results of the tests in which the yarns were exposed to chlorinated water are given in Table III. Note that yarns "j", "k", "l" and "m" are controls and are outside the invention. Yarn "j" contains no zinc oxide. Yarns "k", "l" and "m" contain zinc oxide of less than 99.4% purity and more than 250 ppm (0.025%) sulfur. As indicated by the toughness values, these control yarns degraded much more in chlorinated water than did yarns of the invention "n", "o", "p" and "q" which contained zinc oxide of at least the required 99.4% purity and contained less than 250 ppm (0.025%) of sulfur.

TABLE II

Yarns of Example III

| Sample | Zinc Oxide Identification and Manufacturer | % ZnO in Yarn | % ZnO Purity | Sulfur Impurity ppm |
|---|---|---|---|---|
| j | — | 0 | — | — |
| k | XX-4, New Jersey Zinc* | 1.7 | 99.2 | 1700 |
| l | AZO-55, ASARCO* | 2.2 | 99.2 | 666 |
| m | AZO-88, ASARCO* | 2.8 | 99.3 | 335 |
| n | #20, St. Joe Zinc* | 1.9 | 99.4 | 185 |
| o | Protox 169, New Jersey Zinc+ | 3.4 | 99.7 | 19 |
| p | #911, St. Joe Zinc+ | 1.6 | 99.7 | <15 |
| q | Kadox-15, New Jersey Zinc+ | 3.4 | 99.7 | <15 |

*ZnO prepared by American Process
+ZnO prepared by French Process

TABLE III

Effects of Exposure to Chlorinated Water on the Properties of Yarns of Ex. III

| Sample | Of Invention | Exposure Hours | Elongation, % | Tenacity gpd | Toughness gpd. % | % of Initial Toughness |
|---|---|---|---|---|---|---|
| j | No | 0 | 449 | 1.00 | 449 | 100 |
|   |    | 24 | 181 | 0.10 | 18 | 4 |
|   |    | 72 | 102 | 0.04 | 4 | 1 |
| k | No | 0 | 444 | 0.89 | 395 | 100 |
|   |    | 24 | 361 | 0.21 | 76 | 19 |
|   |    | 72 | 268 | 0.13 | 35 | 9 |
| l | No | 0 | 399 | 0.81 | 323 | 100 |
|   |    | 24 | 429 | 0.28 | 120 | 37 |
|   |    | 72 | 350 | 0.19 | 66 | 20 |
| m | No | 0 | 385 | 0.74 | 285 | 100 |
|   |    | 24 | 272 | 0.14 | 38 | 13 |
|   |    | 72 | 203 | 0.09 | 18 | 6 |
| n | Yes | 0 | 456 | 0.98 | 447 | 100 |
|   |    | 24 | 426 | 0.55 | 234 | 52 |
|   |    | 72 | 433 | 0.39 | 169 | 38 |
| o | Yes | 0 | 459 | 1.01 | 464 | 100 |
|   |    | 24 | 421 | 0.69 | 290 | 62 |
|   |    | 72 | 439 | 0.62 | 272 | 59 |
| p | Yes | 0 | 474 | 1.01 | 479 | 100 |
|   |    | 24 | 458 | 0.66 | 302 | 63 |
|   |    | 72 | 427 | 0.52 | 222 | 46 |
| q | Yes | 0 | 437 | 0.88 | 385 | 100 |
|   |    | 24 | 427 | 0.78 | 333 | 86 |
|   |    | 72 | 423 | 0.69 | 292 | 76 |

As many different embodiments of this invention may be made without departing from the spirit and scope thereof, it is to be understood that this invention is not to be limited to the specific embodiments described herein, except as defined in the appended claims.

I claim:

1. In a spandex fiber, the improvement comprising, for increasing the resistance of the fiber to chlorine-induced degradation, an effective amount of finely divided zinc oxide having a purity of at least 99.4% dispersed in the fiber.

2. A fiber in accordance with claim 1 wherein the zinc oxide has a sulfur content of no more than 0.025%.

3. A fiber in accordance with claim 1 wherein the zinc oxide has a purity of at least 99.7% and a sulfur content of no more than 0.005%.

4. A fiber in accordance with claim 1, 2 or 3 wherein the zinc oxide concentration is in the range of ½ to 10 percent by weight of the fiber.

5. A fiber in accordance with claim 1, 2 or 3 wherein the zinc oxide concentration is in the range of 1 to 3 percent and the mean size of the zinc oxide is in the range of 0.1 to 1 micron.

* * * * *